United States Patent
Schlangen

(10) Patent No.: US 7,034,987 B2
(45) Date of Patent: Apr. 25, 2006

(54) ELECTROPHORETIC DISPLAY DEVICE

(75) Inventor: Lucas Josef Maria Schlangen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/504,707

(22) PCT Filed: Feb. 7, 2003

(86) PCT No.: PCT/IB03/00455

§ 371 (c)(1),
(2), (4) Date: Aug. 16, 2004

(87) PCT Pub. No.: WO03/071348

PCT Pub. Date: Aug. 28, 2003

(65) Prior Publication Data

US 2005/0104843 A1    May 19, 2005

(30) Foreign Application Priority Data

Feb. 19, 2002   (EP) .................................. 02075675
Jul. 26, 2002   (EP) .................................. 02078077

(51) Int. Cl.
  *G02B 26/00*   (2006.01)
  *G09G 3/34*    (2006.01)
  *G01N 27/447*  (2006.01)

(52) U.S. Cl. ........................ 359/296; 345/107; 204/606

(58) Field of Classification Search ................ 359/296; 345/105, 107, 108, 95, 97, 84, 210; 204/600, 204/606; 427/213.3
See application file for complete search history.

(56) References Cited

U.S. PATENT DOCUMENTS

| | | | | |
|---|---|---|---|---|
| 3,668,106 | A * | 6/1972 | Ota | 358/305 |
| 6,017,584 | A * | 1/2000 | Albert et al. | 427/213.3 |
| 6,504,524 | B1 * | 1/2003 | Gates et al. | 345/107 |
| 6,531,997 | B1 * | 3/2003 | Gates et al. | 345/107 |
| 6,822,782 | B1 * | 11/2004 | Honeyman et al. | 359/296 |
| 6,870,661 | B1 * | 3/2005 | Pullen et al. | 359/296 |
| 2003/0038772 | A1 * | 2/2003 | De Boer et al. | 345/107 |

* cited by examiner

*Primary Examiner*—Loha Ben

(57) ABSTRACT

An electrophoretic display device for generating a colored image has pixels each having a medium (12) that is substantially transparent in the optical spectral range and at least two types of independently controllable electrophoretic particles (31C, 31M, 31Y). The particle species absorb certain wavelengths whereas they are transparent (and basically non-scattering) for light that is absorbed in other particle species. By moving these particles in/out a visible area of the pixel by generating electric fields color absorption can be controlled at will. As the particles are basically transparent (at least for the colors absorbed in the other particle species), the full pixel area (and volume) can be used for any particle species. This way the maximum brightness can be achieved for any color.

10 Claims, 3 Drawing Sheets

Figure 1A:
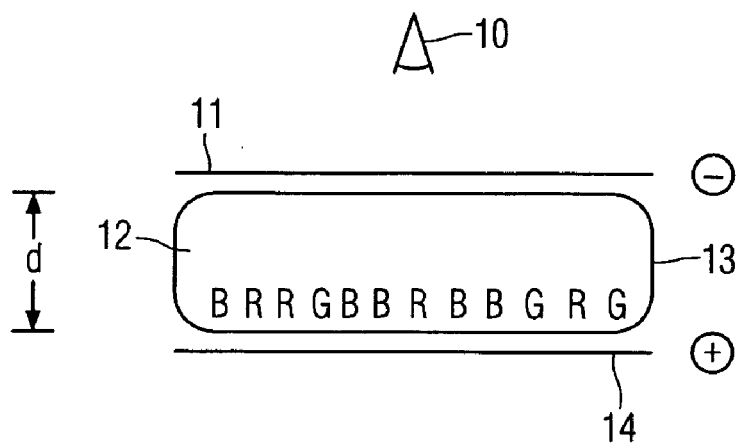

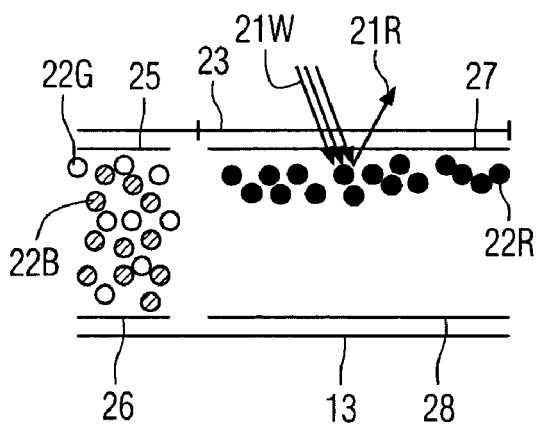
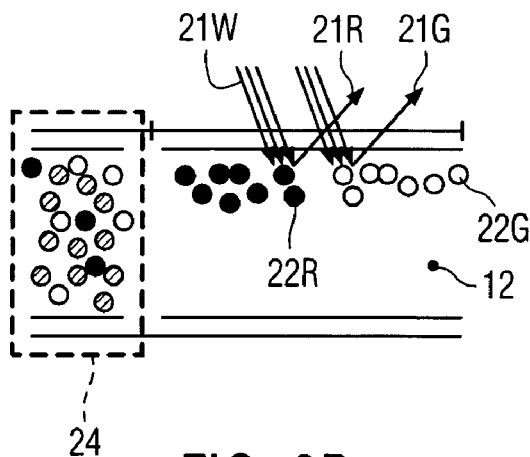
FIG. 2A  FIG. 2B
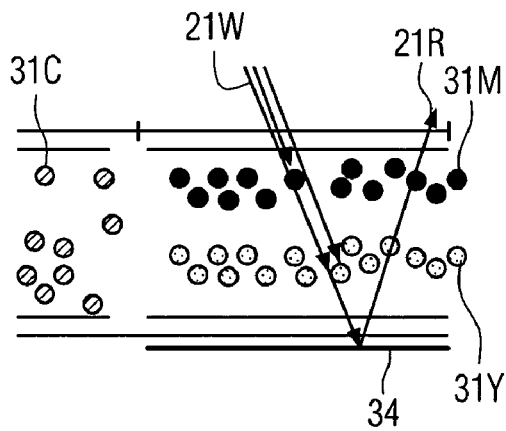
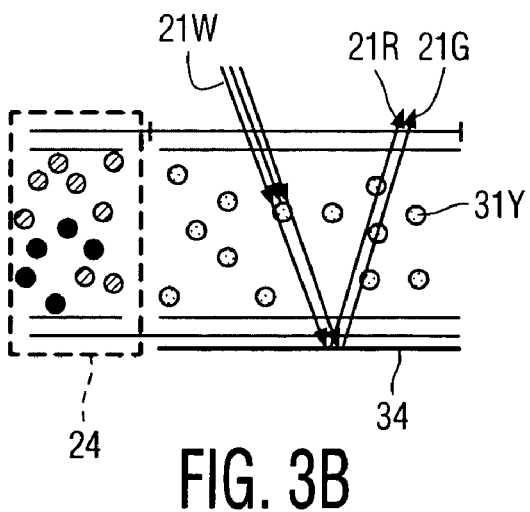
FIG. 3A  FIG. 3B
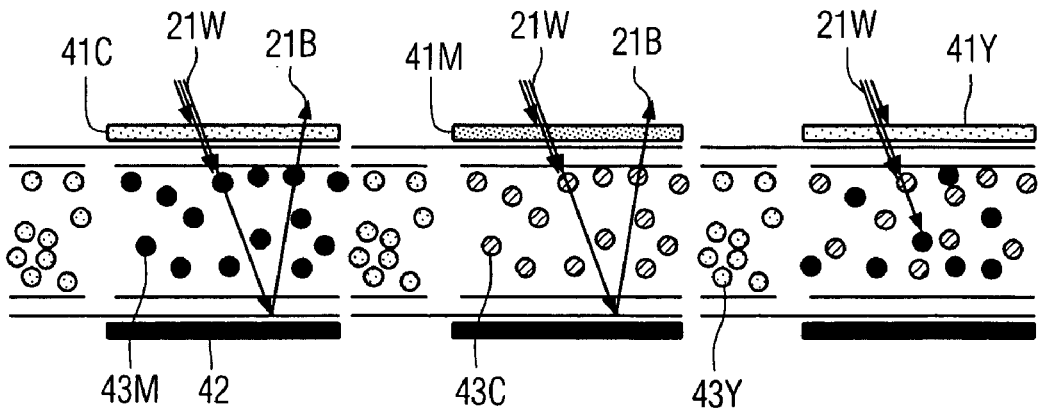
FIG. 4

ELECTROPHORETIC DISPLAY DEVICE

The invention relates to an electrophoretic display device for generating a colored image, the device comprising picture elements which have a visible area, a medium that is substantially transparent in the optical spectral range, at least two types of independently controllable electrophoretic particles, and means for controlling the distribution of the particles in the medium.

An electrophoretic display device is known from patent application WO99/53373. The display device comprises picture elements, each element having several types of particles in a suspending fluid, e.g. as shown in FIGS. 5 to 8 of the document. The particles are charged and are therefore controllable by an electric field, which effect is called the electrophoretic effect. The suspending fluid functions as a medium that permits the particles of different types to travel at different speeds under the influence of the electric field. The movement of each type of particles is controlled by providing electrodes and a suitable pattern of control voltages. Selected particles are moved to a visible area of the picture element. Each type of particles has a specific color, and therefore a specific type of particles at the front surface of the picture element in the visible area result in a specific color of the picture element. In the example shown in FIG. 6 the picture element comprises red (R), green (G) and blue (B) particles. The particles are supposed to be negatively charged, and are first moved to the back end of the picture element by an electric field in a direction transverse to the visible area by a positive voltage between a bottom electrode and a top electrode. Then the voltage is reversed, and the particles start to move to the front of the picture element. The red particles are the fastest, so they arrive first. The voltage is then removed from the electrodes, and the red particles are visible because the red component from the incident white light is reflected. The remaining part of the light is absorbed so that the blue and green components of the incident light cannot reach the blue and green particles which are floating lower in the picture element. Different colors can be generated by moving all particles to the front and thereafter removing faster particles to the backside of the picture element. For example yellow could be generated by moving a mix of red and green particles to the front. A problem of the known display is that contrast and brightness of the colors generated are not satisfactory.

Therefore it is an object of the invention to provide a display device having a higher brightness and contrast.

The object is achieved with a device as defined in the opening paragraph which comprises at least one reservoir located outside the visible area for containing particles that are not in the visible area, each particle type being substantially transparent for a first part of the optical spectral range, being substantially non-back scattering, and being absorbing or reflective for a second part of the optical spectral range, the first and second part together covering the optical spectral range, and the second parts of the optical spectral range of said particle types being substantially non-overlapping. The effect is that particles of a specific type are obstructing substantially no light outside the specific second part of the spectral range. The light produced by the picture element in the specific second part of the optical spectral range is controlled by moving particles of that type to the visible area. The intensity of all second parts of the optical spectral range can be controlled independently, while no light is absorbed in parts of the spectral range by particles that are needed for controlling other spectral ranges. The advantageous effect is that the brightness and contrast for all colors will be high.

The invention is also based on the following recognition. The inventor has seen that the known multicolored picture elements can produce mixed colors only at a reduced brightness. For a primary color, i.e. a color that is produced by a single particle type, a high brightness may be achieved because all incident light of that primary color will be reflected by the particles at the front surface of the picture element. However, a mixed color such as yellow in a system having red, green and blue particles is produced by having 50% green and 50% red particles at the surface of the visible area. Hence only 50% of the incident light is reflected and the brightness for yellow is reduced to 50%. The inventor has concluded that the known system is flawed because it uses particles that obstruct, i.e. absorb or scatter light outside the part of the spectrum that is controlled. Particles that do not obstruct prevent the reduced brightness, provided that they are removed from the visible area to the reservoir when they are not needed.

In an embodiment of the device the non-overlapping second parts together substantially cover the optical spectral range. The advantage is that each picture element can produce all colors of the optical spectral range at maximum brightness, because all light within the optical spectral range can be controlled.

In an embodiment of the device the particles are substantially non-scattering due to at least one of the following: due to having a refractive index substantially equal to the refractive index of the electrophoretic medium, due to the size of the particles being smaller than the wavelength of light in the optical spectral range, due to the size of the light absorbing layers/structures in the particle being below an internal wavelength in the particle, the internal wavelength being the wavelength of light in the optical spectral range divided by the refractive index of the particle. The advantage is that the contrast is enhanced by the particles being non-scattering.

In an embodiment of the device the picture elements comprise color filters in which each picture element color filter absorbs or reflects at least one filtered part of the optical spectral range while the remaining non-filtered part of the optical spectral range substantially corresponds to the range of the optical spectral range covered by said second parts of the particle types in the respective picture element. The advantage is that several colors can be produced using a combination of color filters and fewer types of particles within the medium.

Further preferred embodiments of the device according to the invention are given in the further claims.

Figure 1B:
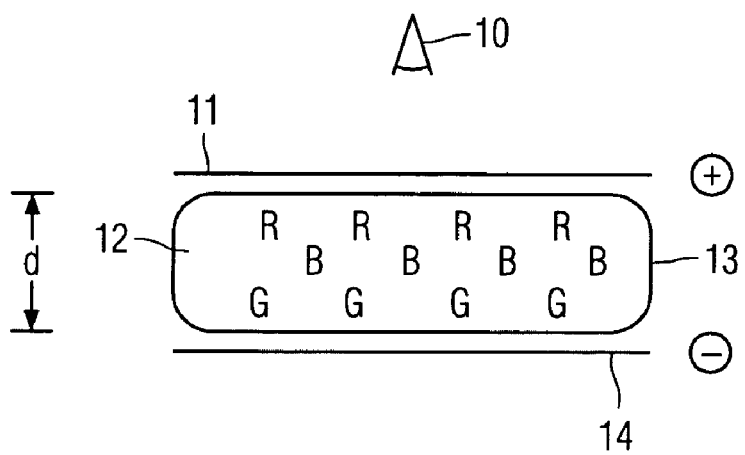
Figure 5:
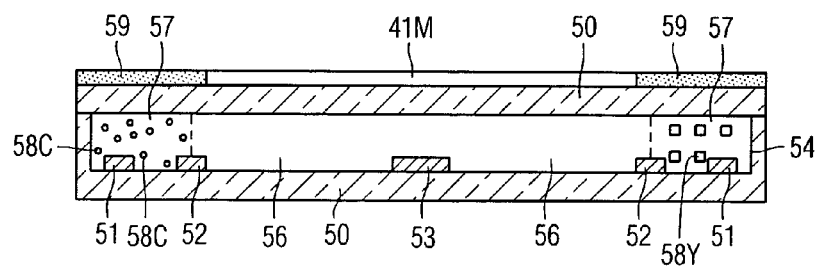

These and other aspects of the invention will be apparent from and elucidated further with reference to the embodiments described by way of example in the following description and with reference to the accompanying drawings, in which:

FIG. 1A shows a prior art picture element of a reflective display in reset mode, FIG. 1B shows a prior art picture element of a reflective display in red display mode, FIG. 2A shows a display having obstructing particles in red display mode, FIG. 2B shows a display having obstructing particles in yellow display mode, FIG. 3A shows a display having non-obstructing particles in red display mode, FIG. 3B shows a display having non-obstructing particles in yellow display mode, FIG. 4 shows three cooperating picture elements having color filters, and FIG. 5 shows a picture element having a color filter.

The Figures are diagrammatic and not drawn to scale. In the Figures, elements which correspond to elements already described have the same reference numerals.

FIG. 1 shows a prior art electrophoretic display picture element in different states. FIG. 1A shows a prior art picture element of a reflective display in reset state. The picture element 13 (also called pixel) is seen from a viewing direction 10. A medium 12 comprises electrophoretic particles indicated by the characters R, G, B indicating the colors red, green and blue. Each particle type reflects a particular color, and absorbs the remaining part of the optical spectrum. A top electrode 11 and a bottom electrode 14 are provided for controlling the movement of the colored particles in the depth direction indicated by 'd' transverse to the visible area. The electrodes 11,14 do not block the visible area of the picture element. The particles are supposed to be negatively charged, and are moved to the bottom end of the picture element 13 by an electric field in a direction transverse to the visible area by a positive voltage between the bottom electrode 14 and the top electrode 11. All particles R, G, B are moved to the bottom of the picture element 13 for achieving the reset state. The medium usually is transparent, and therefore in the reset state light of all colors will be reflected resulting in a white color being produced by the picture element. The medium in this type of pixel may also be colored. FIG. 1b shows a prior art picture element of a reflective display in red display state. Selected particles R are located at the visible front surface area of the picture element 13. The specific type R of particles at the front surface of the picture element in the visible area results in the specific color red of the picture element. The red state is achieved as follows. After the reset state the voltage is reversed, and the particles start to move to the front of the picture element. Particles have different speeds of movement at certain strength of the electric field. The red particles R are the fastest, so they arrive first at the front surface. The voltage is then removed from the electrodes, and the red particles are visible because the red component from incident white light is reflected. The remaining part of the light is absorbed so that the blue and green components of the incident light cannot reach the blue and green particles which are floating lower in the picture element. Different colors can be generated by moving all particles to the front and thereafter removing faster particles to the backside of the picture element.

FIG. 2A shows a display having obstructing particles in red display mode. FIG. 2B shows the same picture element in yellow display mode. The Figure is intended to explain the negative effect of using obstructing particles. White light 21W is shown to be incident on the visible area 23 of the picture element. A reservoir 24 is shown on the left side of the picture element, which reservoir is not visible for the viewer, e.g. by providing a black mask above the reservoir 24. A top electrode 25 and a bottom electrode 26 are positioned in the reservoir to control the movement of the particles. A top electrode 27 and a bottom electrode 28 are positioned in the visible area 23 to control the movement of the particles. Positive and negative voltages are applied to the various electrodes 25,26,27,28 to independently control the movement of the different types of particles. For good contrasts the pixel preferably is placed on a black background. In FIG. 2A the picture element is shown in red display state. Red light 21R is shown to be reflected by the red particles 22R, which are located in the visible area. The blue particles 22B and the green particles 22G are located in the reservoir. In FIG. 2A the picture element is shown in yellow display state. Red light 21R and green light 21G is shown to be reflected by the red particles 22R and 22G, which are located in the visible area. The blue particles 22B and some green particles 22G and red particles 22R are located in the reservoir. Half of the viewing area is covered with red and the other half with green particles. In this case the brightness for yellow is 50% of the maximum achievable yellow brightness if all red and green light would have been reflected. It is to be noted that a random distribution of particles 22R and 22G at the interface would produce the same effect.

Particles used in existing electrophoretic display concepts obscure other particles, and colors are made by having different particle species near the top electrode where there is a limited viewing area available. In electrophoretic displays based on obscuring particles it is not possible to produce any color over the full pixel area. This results in a considerable loss of (color) brightness.

FIG. 3A shows a display having non-obstructing particles in red display state. FIG. 3B shows a display having non-obstructing particles in yellow display state. FIG. 3 shows a picture element according to the invention. The pixel of the electrophoretic display has three non-obstructing particle species in a suspending medium. The medium may for example be a transparent fluid or a gas. The particle species are absorbing for red indicated as cyan 31C, absorbing green indicated as species magenta 31M and absorbing blue indicated as yellow 31Y, whereas each species is basically transparent for the light absorbed in other species. The pixel has a reservoir 24 that is not visible to the observer. The pixel has a visible area which is visible to the viewer and has a reflecting background 34. FIG. 3A shows the red state where the full visible area can contain both green 31M and blue 31Y absorbing particles. FIG. 3B shows the yellow state where the pixel volume contains blue absorbing particles 31Y. In both cases 100% of the maximum achievable brightness is obtained for the colors produced. Note that in FIG. 3A the same optical perception of the pixel would result when the particle species are distributed more randomly throughout the pixel volume. It is to be noted that all picture elements shown in FIGS. 3 and 4 have a configuration similar to FIG. 2, including the visible area 23, the reservoir 24 and electrodes 25,26,27,28. The picture elements according to the invention may have a reflector and be used in a reflective system as shown in FIGS. 3 and 4, but alternatively be used in a transmissive system without a background reflector, e.g. using a backlight unit.

The electrophoretic display according to the invention uses particle species that absorb (or reflect) certain wavelengths whereas they are transparent (and basically non-scattering) for light that is absorbed in other particle species. It is noted that back-scattering is to be prevented, but some degree of forward scattering can be beneficial for the contrast. Further it is to be noted particles in this document also includes (micro-) emulsions, i.e. the suspending medium comprises small droplets of a second liquid medium, which droplets are electrophoretically controllable. By moving the particles in/out a pixel volume, color absorption can be controlled or switched on and off at will. As the particles are basically transparent (at least for the colors absorbed in the other particle species), the full pixel area (and volume) can be used for any particle species. This way the maximum brightness can be achieved for any color. The particle species are moved electrophoretically into the pixel volume from a connecting reservoir (area or volume) or vice-versa. In the reservoir particles are not visible to the observer. The reservoir is adjacent or below the pixel volume. In an embodiment the reservoir is common for all particle species; alternatively each particle species can have its own specific reservoir area or volume.

The suspending medium is transparent so that in the absence of particles the observer sees the background through the pixel volume. The background can be a white diffuser, a rough reflector or, when combined with a front scattering film, a specular reflector.

The table below gives an example of desired optical properties for an electrophoretic display with three particles:

| particle species | absorbing for | transparent for |
| --- | --- | --- |
| 1 | red | green, blue |
| 2 | green | red, blue |
| 3 | blue | red, green |

This set of three particle species results in a full color pixel by using a reservoir from which the particles are drawn into the pixel volume. Without particles, the background is visible through the pixel volume. The background is reflecting for all colors. The reflection can be specular, diffuse or any combination.

In the dark state, all incoming light must be adsorbed and all particle species have to be present in the pixel volume. In case the absorption bands of the particle species do not fully overlap, top filters or an additional 'black' absorbing particle species can be used to enhance the contrast. The 'black' particles are absorbing in a substantial part of the optical spectral range, including an overlap with at least some of the second parts.

The white state is produced by removing all particles from the pixel volume into the reservoir so that the background becomes visible through the pixel volume.

Any color can be made in the electrophoretic pixel by mixing the right amount of the various particle species in the pixel volume.

FIG. 4 shows three cooperating picture elements having color filters. The left pixel has a cyan filter 41C, the middle pixel has a magenta filter 41M, and the right pixel has a yellow filer 41Y. The three sub-pixels have CMY color filters combined with three different kinds of two-particle electrophoretic sub-pixels based on non-obstructing particle species and constitute a full color system. Particles in the reservoir to the left of the visible area having the filter are not visible to the viewer. Below the pixel volume a reflecting background is placed. The blue state can be achieved in only two of the three sub pixels. In the yellow color filter element 41Y on the right, blue light is absorbed and the corresponding pixel is switched to the dark (absorbing) state in order to obtain a saturated blue for the viewer. Hence, ⅓ of the display area cannot be used for blue. The same applies for other colors. Therefore, the total color brightness is 67% of the maximum achievable color brightness. However each sub-pixel only needs to control two types of particles, which is easier to manufacture and faster in response.

In an embodiment electrophoretic pixels are combined with a spatially separated subtractive color filter. In one specific embodiment only two particles species are required per pixel to produce a full color display as shown in FIG. 4. The optical properties of the particles are chosen depending on the color absorbed in the overlying color filter element. The table below gives an example for particles that can be combined in an electrophoretic pixel underlying a cyan color filter element.

| display element | absorbing for | transparent for |
| --- | --- | --- |
| cyan color filter element | red | green, blue |
| particle 1 | green | (red) blue |
| particle 2 | blue | (red) green |

The cyan color filter element always absorbs red light so the combination given in the table cannot yield a red pixel. Magenta and yellow color filter elements can be combined with other electrophoretic pixels to yield red. In the CMY color filter display, only two out of the three CMY color filter elements can be used to yield a certain primary color (red, green, blue). This means that ⅓ of the incoming light is lost for color production. Hence, a color brightness of ⅔ of the maximal color brightness can be achieved, and it requires only two particle species.

When using non-obstructing particles, the whole pixel volume determines the optical perception of a pixel. The perception is rather independent of the internal distribution of the particle species in the pixel volume. Random and ordered distributions may give the same optical appearance.

The reservoir can be partially shielded from the pixel volume by means of a wall. Each pixel can have its own reservoir but one reservoir can also serve several pixels. Electrode structures in the reservoir and pixel allow selectively transporting particle species from the reservoir into the pixel volume. The electrode structures can move particles through lateral or transversal fields or any combination. Particles in the reservoir are not visible to the observer. This can be achieved by means of a black mask, by a black reservoir background or by situating the reservoir beneath the reflecting background of the pixel. The reservoir has to be designed in such a way that it occupies a minimal viewing area. Pixel walls can surround pixels as long as these walls do allow for connections to the reservoir(s).

Non-obstructing particle species can be derived along methods known from the liquid toner, ink and pigment industry, or from electrophotographic technologies. Non-obstructing particles that reflect specific parts of the optical spectrum are cholesteric flakes. In order for particles to be transparent for non-absorbed wavelengths, the size of the light absorbing layers/structures in each particle should be well below the internal wavelength in the article (i.e., the wavelength of the light divided by the refractive index of the particle). For this purpose small (nanometer sized) particles can be used. Alternatively a larger (porous) particle with a refractive index matched to the solvent can be used. Light absorption can then be achieved by coating the outside or/and in the pores with a dye layer that is thinner than the internal wavelength of the light. Suitable pigment particles can be acquired from pigment industry, e.g. a diarylide yellow pigment based on dichlorobenzidine (known as Novoperm Yellow HR02 from Clariant), a quinacridone magenta pigment (known as Toner Magenta E 02, or PV Fast Red E5B, or PV Fast Pink E from Clariant), and a phtalocyanine cyan pigment (known as Toner Cyan BG from Clariant), all having particle sizes of 50 to 150 nm (typical values).

FIG. 5 shows a picture element having a color filter. Between two transparent substrates or support plates 50 a suspending fluid and electrophoretic particles are located. The Figure shows a picture element having a magenta color filter element 41M. A reservoir 56 comprises a substantially transparent or translucent fluid while the auxiliary reservoirs 57 comprise particles, 58Y and 58C, which absorb at least blue and at least red respectively. By providing electrodes 51, 52, 53 with appropriate voltages the particles 58 move to the reservoir 56. The electro-optical components particles, 58Y and 58C) are now intermixed within the reservoir 56. The auxiliary reservoirs 57 are provided with a black mask 59. It is to be noted that an embodiment of the picture element has no filter element 41M, but only at least two types of particles. A number of additional reservoirs may be used for different types of particles. Further details of configurations for controlling different types of electrophoretic particles using reservoirs and electrodes are described in co-pending patent application EP 01203176.1 (application number of PHNL 010567).

In further embodiments of the device the particles are not fully mobile or may be partially fixed, for instance a working device can be based on a Cholesteric Liquid Crystal material of two different colors in which switching between a transparent or translucent state and a reflective state occurs at different voltages for different colors. The CLC material does not necessarily have to be a layer. It can also have the form of encapsulated flakes or particles.

Layers comprising such capsules or other layers comprising (controllable) reflecting or absorbing particles do not need to be completely transparent, as long as the main direction of the light propagation is maintained (translucent or forward scattering layers). Scattering may even be advantageous, provided no significant backscattering occurs, to obtain better absorption, leading to thinner layers. To this end the pixel walls 54 may be provided with a reflecting or absorbing layer.

In the example the color filter parts absorb (or reflect) the colors cyan, magenta and yellow. In principle the device can also be based on a color filter having colors which absorb (or reflect) other parts of the optical spectral range and adapting the switchable components (layers) accordingly. For example one could use a first sub-pixel having a color filter part absorbing in the range 550–650 nm, a second sub-pixel having a color filter part absorbing in the range 450–550 nm and a third sub-pixel having a color filter part absorbing in the range 400–450 nm and 650–7000 nm. The optical spectral range on the other hand may include infrared and ultraviolet. In general the above embodiment of the device can be understood as having a color filter in which n sub-pixel color filter parts absorb or reflect n parts of the optical spectral range (preferably non-overlapping or having minimal overlap), the device comprising (n−1) switchable electro-optical components for controlling absorption or reflection of the remainder of the spectral range in each sub-pixel.

Although the invention has been mainly explained by embodiments using optical elements using the electrophoretic effect, the invention is also suitable for other controllable optical elements such as electrochromic displays. It is noted, that in this document the use of the verb 'comprise' and its conjugations does not exclude the presence of other elements or steps than those listed and the word 'a' or 'an' preceding an element does not exclude the presence of a plurality of such elements, that any reference signs do not limit the scope of the claims, and that several 'means' or 'units' may be represented by the same item. Further, the scope of the invention is not limited to the embodiments, and the invention lies in each and every novel feature or combination of features described above.

The invention claimed is:

1. Electrophoretic display device for generating a colored image, the device comprising picture elements which have:
   a visible area,
   a medium that is substantially transparent in an optical spectral range,
   at least two types of independently controllable electrophoretic particles,
   means for controlling the distribution of the particles in the medium, and
   at least one reservoir located outside the visible area for containing particles that are not in the visible area,
      each particle type being substantially transparent for a first part of the optical spectral range, being substantially non-scattering, and being absorbing or reflective for a second part of the optical spectral range,
      the first and second parts together covering the optical spectral range, and
      the second parts of the optical spectral range of said particle types being substantially non-overlapping.

2. Device as claimed in claim 1, wherein the non-overlapping second parts together substantially cover the optical spectral range.

3. Device as claimed in claim 1, wherein the particles are substantially non-scattering due to at least one of the following: due to having a refractive index substantially equal to the refractive index of the electrophoretic medium, due to the size of the particles being smaller than the wavelength of light in the optical spectral range, due to the size of the light absorbing layers/structures in each particle being below an internal wavelength in the particle, the internal wavelength being the wavelength of light in the optical spectral range divided by the refractive index of the particle.

4. Device as claimed in claim 1, wherein the particles are porous and substantially non-scattering due to having a refractive index substantially equal to the refractive index of the electrophoretic medium and being larger than the wavelength of light in the optical spectral range, the particles and/or the pores being coated by a dye layer that is thinner than internal wavelength in the particles, the internal wavelength being the wavelength of light in the optical spectral range divided by the refractive index of the particles.

5. Device as claimed in claim 1, wherein the device comprises a background reflector behind the picture elements, the background reflector in particular being a white diffuser or a rough reflector, or a front scattering film and a background reflector behind the picture elements, the background reflector being a specular reflector.

6. Device as claimed in claim 5, wherein the reservoir is located behind the background reflector.

7. Device as claimed in claim 1, wherein the picture elements further comprise an additional type of independently controllable electrophoretic particles, which additional type is absorbing in a substantial part of the optical spectral range, including an overlap with at least some of the second parts.

8. Device as claimed in claim 1, wherein the picture elements comprise at least two electrodes for selectively transporting the particles from the reservoir to the visible area and vice versa.

9. Device as claimed in claim 1, wherein the picture elements comprise color filters in which each picture element color filter absorbs or reflects at least one filtered part of the optical spectral range while the remaining non-filtered part of the optical spectral range substantially corresponds to the range of the optical spectral range covered by said second parts of the optical spectral range of the particle types in the respective picture element.

10. Device as claimed in claim 9, wherein the picture elements comprise n different color filters, n being an integer larger than 1, the filtered parts of the optical spectral range being substantially non-overlapping.

* * * * *